United States Patent
Achara et al.

(10) Patent No.: US 12,017,556 B2
(45) Date of Patent: Jun. 25, 2024

(54) REAL-TIME CONTROL OF AN ELECTRIC VEHICLE CHARGING STATION WHILE TRACKING AN AGGREGATED POWER-SETPOINT

(71) Applicant: ECOLE POLYTECHNIQUE FEDERALE DE LAUSANNE (EPFL), Lausanne (CH)

(72) Inventors: Jagdish Prasad Achara, Yverdon-les-Bains (CH); Cong Wang, Renens (CH); Mario Paolone, La Conversion (CH); Roman Rudnik, Prilly (CH); Jean-Yves Le Boudec, Jouxtens-Mézery (CH); Lorenzo Enrique Reyes Chamorro, Valdivia (CL)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 367 days.

(21) Appl. No.: 17/617,627

(22) PCT Filed: Jun. 13, 2019

(86) PCT No.: PCT/IB2019/054963
§ 371 (c)(1),
(2) Date: Dec. 9, 2021

(87) PCT Pub. No.: WO2020/250012
PCT Pub. Date: Dec. 17, 2020

(65) Prior Publication Data
US 2022/0250500 A1 Aug. 11, 2022

(51) Int. Cl.
*B60L 53/63* (2019.01)
*B60L 53/53* (2019.01)
(Continued)

(52) U.S. Cl.
CPC ............ *B60L 53/64* (2019.02); *B60L 53/53* (2019.02); *B60L 53/65* (2019.02); *B60L 58/16* (2019.02)

(58) Field of Classification Search
CPC .......... B60L 53/64; B60L 53/53; B60L 53/65; B60L 58/16; B60L 53/63; Y02E 60/00
See application file for complete search history.

(56) References Cited

U.S. PATENT DOCUMENTS

| 10,320,203 B2 | 6/2019 | Low et al. | |
|---|---|---|---|
| 2016/0009192 A1* | 1/2016 | Zhang | G06Q 50/06 320/109 |
| 2017/0110895 A1* | 4/2017 | Low | B60L 53/63 |

FOREIGN PATENT DOCUMENTS

| WO | WO 2017066790 | 4/2017 | |
|---|---|---|---|
| WO | WO-2020229087 A1 * | 11/2020 | B60L 53/30 |

OTHER PUBLICATIONS

Acha, S., Green, T. C., & Shah, N. (Apr. 2010). Effects of optimised plug-in hybrid vehicle charging strategies on electric distribution network losses. In IEEE PES T&D 2010 (pp. 1-6). IEEE.
(Continued)

*Primary Examiner* — Justin Holmes
(74) *Attorney, Agent, or Firm* — Nixon & Vanderhye P.C.

(57) ABSTRACT

An electric vehicle (EV) charging method which considers the EVs heterogeneity, taking into account the absence of any information about future arrivals and departures, and of the amount of time any charging will take. The method further considers both switch on and off possibilities and not an arbitrarily small minimum charging power. In order to achieve all these objectives, the invention defines novel metrics and uses them to construct a dedicated optimization problem. As the charging power is discontinuous, the minimum charging power not being arbitrarily small, the optimization problem is mixed integer by nature. Further,
(Continued)

because the mixed-integer optimization is difficult to perform in real-time, the invention proposes a heuristic for reducing the number of integer variables, thus reducing the complexity of the problem.

6 Claims, 5 Drawing Sheets

(51) Int. Cl.
*B60L 53/64* (2019.01)
*B60L 53/65* (2019.01)
*B60L 58/16* (2019.01)

(56) References Cited

OTHER PUBLICATIONS

Bernstein, A., Reyes-Chamorro, L., Le Boudec, J. Y., & Paolone, M. (2015). A composable method for real-time control of active distribution networks with explicit power setpoints. Part I: Framework. Electric Power Systems Research, 125, 254-264.
Block, D., Harrison, J., Brooker, P., Center, F. S., & Dunn, M. D. (2015). Electric vehicle sales for 2014 and future projections. Electric Vehicle Transportation Center.
Clement, K., Haesen, E., & Driesen, J. (Mar. 2009). Coordinated charging of multiple plug-in hybrid electric vehicles in residential distribution grids. In 2009 IEEE/PES Power Systems Conference and Exposition (pp. 1-7). IEEE.
Deilami, S., Masoum, A. S., Moses, P. S., & Masoum, M. A. (2011). Real-time coordination of plug-in electric vehicle charging in smart grids to minimize power losses and improve voltage profile. IEEE Transactions on Smart Grid, 2(3), 456-467.
Dharmakeerthi, C. H., Mithulananthan, N., & Saha, T. K. (2014). Impact of electric vehicle fast charging on power system voltage stability. International Journal of Electrical Power & Energy Systems, 57, 241-249.
Evans, P. B., Kuloor, S., & Kroposki, B. (Sep. 2009). Impacts of plug-in vehicles and distributed storage on electric power delivery networks. In 2009 IEEE Vehicle Power and Propulsion Conference (pp. 838-846). IEEE.
Fernandez, L. P., San Román, T. G., Cossent, R., Domingo, C. M., & Frias, P. (2010). Assessment of the impact of plug-in electric vehicles on distribution networks. IEEE transactions on power systems, 26(1), 206-213.
Gan, L., Topcu, U., & Low, S. H. (2012). Optimal decentralized protocol for electric vehicle charging. IEEE Transactions on Power Systems, 28(2), 940-951.

He, Y., Venkatesh, B., & Guan, L. (2012). Optimal scheduling for charging and discharging of electric vehicles. IEEE transactions on smart grid, 3(3), 1095-1105.
Hillier, F. S., & Lieberman, G. J. (2010). Introduction to Operations Research, McGraw-Hil (first 10 pages).
International Search Report dated Mar. 2, 2020 for Application No. PCT/IB2019/054963.
Liu, M., McLoone, S., Stüdli, S., Middleton, R., Shorten, R., & Braslavs, J. (Dec. 2013). On-off based charging strategies for EVs connected to a Low Voltage distributon network. In 2013 IEEE PES Asia-Pacific Power and Energy Engineering Conference (APPEEC) (pp. 1-6). IEEE.
Liu, M., McNamara, P., & McLoone, S. (Oct. 2013). Fair charging strategies for EVs connected to a low-voltage distribution network. In IEEE PES ISGT Europe 2013 (pp. 1-5). IEEE.
Lopes, J. A. P., Soares, F. J., & Almeida, P. M. R. (2010). Integration of electric vehicles in the electric power system. Proceedings of the IEEE, 99(1), 168-183.
Ma, Z., Callaway, D. S., & Hiskens, I. A. (2013). Decentralized charging control of large populations of plug-in electric vehicles. IEEE Transactions on control systems technology, 21(1), 67-78.
Mou, Y., Xing, H., Lin, Z., & Fu, M. (2015). Decentralized optimal demand-side management for PHEV charging in a smart grid. IEEE Transactions on Smart Grid, 6(2), 726-736.
Pillai, J. R., & Bak-Jensen, B. (Sep. 2010). Impacts of electric vehicle loads on power distribution systems. In 2010 IEEE Vehicle Power and Propulsion Conference (pp. 1-6). IEEE.
Putrus, G. A., Suwanapingkarl, P., Johnston, D., Bentley, E. C., & Narayana, M. (Sep. 2009). Impact of electric vehicles on power distribution networks. In 2009 IEEE Vehicle Power and Propulsion Conference (pp. 827-831). IEEE.
Radunovic, B., & Le Boudec, J. Y. (2006). A unified framework for max-min and min-max fairness with applications. IEEE/ACM Transactions on networking, 15(5), 1073-1083.
Scolari, E., Torregrossa, D., Le Boudec, J. Y., & Paolone, M. (Oct. 2016). Ultra-short-term prediction intervals of photovoltaic AC active power. In 2016 International Conference on Probabilistic Methods Applied to Power Systems (PMAPS) (pp. 1-8). IEEE.
Sortomme, E., & El-Sharkawi, M. A. (2011). Optimal scheduling of vehicle-to-grid energy and ancillary services. IEEE Transactions on Smart Grid, 3(1), 351-359.
Vandael, S., Claessens, B., Hommelberg, M., Holvoet, T., & Deconinck, G. (2012). A scalable three-step approach for demand side management of plug-in hybrid vehicles. IEEE Transactions on Smart Grid, 4(2), 720-728.
Written Opinion of the ISA dated Mar. 2, 2020 for Application No. PCT/IB2019/054963.
Xie, S., Zhong, W., Xie, K., Yu, R., & Zhang, Y. (2016). Fair energy scheduling for vehicle-to-grid networks using adaptive dynamic programming. IEEE transactions on neural networks and learning systems, 27(8), 1697-1707.

* cited by examiner

Algorithm 1 Heuristic for partitioning $C[k]$.

Input: $C[k]$, $m \geq 1$, $0 \leq \widetilde{P}^{\text{req}}[k] \leq \sum_{i \in C[k]} P_i^{\max}$

Output: partition $S[k], S^{\text{on}}[k], S^{\text{off}}[k]$ of $C[k]$, such that $|S[k]| \leq m$ and $\widetilde{P}^{\text{req}}[k] \in [P^{\text{lb}}, P^{\text{ub}}]$ computed in (15)

1: if $|C[k]| \leq m$ then
2:    $S[k] = C[k]$, $S^{\text{on}}[k] = S^{\text{off}}[k] = \emptyset$,
3:    stop algorithm.
4: else
5:    $S[k] = \text{top}(C[k], m)$,
6:    $S^{\text{on}}[k] = \{i \mid i \in \mathcal{R}, \omega_i[k-1] = 1\}$,
7:    $S^{\text{off}}[k] = \{i \mid i \in \mathcal{R}, \omega_i[k-1] = 0\}$,
8:    let $\mathcal{R} = C[k] \setminus S[k]$.
9: end if
10: compute reduced flexibility bounds as in (15).
11: while $\widetilde{P}^{\text{req}}[k] \notin [P^{\text{lb}}, P^{\text{ub}}]$ and $\mathcal{R} \neq \emptyset$ do
12:    $i = \text{top}(\mathcal{R}, 1)$, $j = \text{top}(S[k], 1)$
13:    if $\widetilde{P}^{\text{req}}[k] > P^{\text{ub}}$ then
14:      $S^{\text{on}}[k] = S^{\text{on}}[k] \cup \{j\}$
15:    else if $\widetilde{P}^{\text{req}}[k] < P^{\text{lb}}$ then
16:      $S^{\text{off}}[k] = S^{\text{off}}[k] \cup \{j\}$
17:    end if
18:    update $S[k] = S[k] \cup \{i\} \setminus \{j\}$
19:    if $i \in S^{\text{on}}[k]$ then
20:      remove $i$ from $S^{\text{on}}[k]$
21:    else
22:      remove $i$ from $S^{\text{off}}[k]$
23:    end if
24:    recompute bounds according to (15)
25:    update $\mathcal{R} = \mathcal{R} \setminus \{i\}$
26: end while

FIG. 5 ized. An alternative is to use a grid controller with
explicit power-setpoints (e.g., [11]). In this case, the CS only
needs to follow a power setpoint and allocate this aggregated
power-setpoint among the connected EVs. For the grid
controller to compute valid setpoints, it should be informed
about the flexibility of all controlled resources. Since the
flexibility of the CS depends on the situation (number and
type of connected EVs, State-of-Energy of EV batteries,
etc.), it has to be updated repeatedly.

REAL-TIME CONTROL OF AN ELECTRIC VEHICLE CHARGING STATION WHILE TRACKING AN AGGREGATED POWER-SETPOINT

CROSS REFERENCE TO RELATED APPLICATIONS

The present application is a United States national stage application of international patent application with the Serial No. PCT/IB2019/054963 filed on Jun. 13, 2019 designating the United States, the contents of this document being herewith incorporated by reference in its entirety.

FIELD OF INVENTION

The invention is in the field of control of the charging of electric vehicles.

BACKGROUND

The penetration of electric vehicles (EVs) in the market is expected to dramatically increase in the next decade. For example, given an expected sale growth of 20%, there will be more than four million EVs in USA by 2024 [1]. This will affect the planning and operation of electrical grids with particular reference to distribution networks. Indeed, uncoordinated and random EV-charging may largely impact supply quality and continuity. In such case, power flows and voltage-quality patterns throughout the grid will be affected considerably [2], and might increase the risk of local blackouts due to overloads. The authors in [3]-[7] show how uncontrolled charging of EVs might jeopardize the operation of the power grid, causing voltage deviations or increasing power system losses [8], [9].

For example, consider a potentially common situation of a distribution network that contains local generation (PV panels) and an EV charging-station (CS), both connected to the main grid through a transformer. When EVs are mostly charged by the PV production, a rapid PV power-drop (that could reach up to 60% of the rated power in few seconds [10]) will suddenly increase the power flow through the transformer. This might cause the transformer to exceed its rated power. Alternatively, the CS can reduce its charging power to compensate for the solar drop. However, this requires the CS to constantly update, given external conditions, the maximum charging-power it can consume. To cope with such situations, the nave approach would be for the CS to know the precise amount of PV injected-power, and the transformer rated-power. Yet, this solution is not scalable. An alternative is to use a grid controller with explicit power-setpoints (e.g., [11]). In this case, the CS only needs to follow a power setpoint and allocate this aggregated power-setpoint among the connected EVs. For the grid controller to compute valid setpoints, it should be informed about the flexibility of all controlled resources. Since the flexibility of the CS depends on the situation (number and type of connected EVs, State-of-Energy of EV batteries, etc.), it has to be updated repeatedly.

The allocation of power to EVs is a difficult task since, as previously mentioned, an aggregated power-setpoint can change dramatically in few seconds. The naive power allocation, which would transfer these variations directly to EVs, could increase their battery ageing by creating large power-jumps, mini-cycles, as well as frequent on-off switching of EVs. Moreover, the power should be allocated fairly considering that each EV has its own energy demand and remaining time at the CS. Indeed, due to the decisions of the local-grid controller, the aggregated power-setpoint might not be enough to satisfy the demand of all EVs. Authors in [12] minimize the battery-degradation cost associated to additional cycling, assuming that there is sufficient amount of power to satisfy the EVs demand, hence fairness issues are not addressed. Studies in [13]-[15], on the contrary, propose charging schemes that consider fairness of the power allocation among EVs, though without accounting for battery wearing.

Accordingly, it is one aim of the invention to consider both battery wearing and fair-demand satisfaction, while tracking the aggregated power-setpoint.

Furthermore, the battery sizes, charging rates, initial and desired departure State-of-Energy, can be different for every EV. The authors in [16] propose a load-management control strategy for minimizing the power losses and improving the voltage profile during peak hours by assuming that EVs are scheduled in three different types of charging periods. The authors in [17] develop a decentralized control-scheme, using concepts from non-cooperative games, showing optimality when the EVs characteristics are identical (same departure time, energy demand and maximum charging-power) and all charging schedules are agreed upon with the CS one-day ahead. [18] proposes an online charging-algorithm assuming that no EVs will arrive when a charging schedule is made. Furthermore, studies [2], [19], [20] assume that all the EVs have the same charging rate. However, such assumptions do not hold in practice.

It is a further aim of the invention to take into account that we do not have any information about future arrivals and departures, nor can we know the amount of time any charging will take.

Additionally, a common assumption in the literature is that the charging power of an EV is a continuous value between 0 and the maximum power (e.g., [15], [19], [20]). However, in reality, this is not the case because an EV can be either switched off and consume no power, or charge at a power that lies between non-zero bounds, where the minimum charging-power cannot be arbitrarily small. The authors in [22] developed a distributed control-scheme that support on-off states, but is limited to a constant power when on.

It is a further aim of the invention to take into account both switch on and off possibilities and not any arbitrarily small minimum charging power.

In other words, the invention has the following objectives: (i) follow an aggregated power-setpoint, (ii) minimize the battery degradation of each EV and (iii) fairly allocate the power proportional to the EVs needs.

SUMMARY OF INVENTION

In a first aspect, the invention provides a method for controlling the charging of at least an electrical vehicles (EVs) connected to a single charging station (CS), whereby the at least one electrical vehicle may be either locked or unlocked, an EV being locked if it is in the process of reacting or implementing a setpoint. The method comprises continuously tracking at the charging station of a number of the at least one electric vehicle connected; controlling from the charging station a charging power of each EV by sending a setpoint $P_i[k]$ to an EV i at time k; receiving at the charging station a measured power $\hat{P}_i[k]$ from each EV i at time k; computing at a grid controller for all EVs that are not locked at the time k, an aggregated power-setpoint $P^{req}[k]$ in real time; receiving at the charging station the aggregated power-setpoint $P^{req}[k]$ at any time k; sending from the charging station to the grid controller a charging station power flexibility interval, the latter being a power range which the charging station is configured to implement; allocating an overall consumed power fairly among the connected EVs by solving the following optimisation problem:

(P)

$$\min_{P_i[k],\omega_i[k]} c_0(\tilde{P}^{req}[k] - \sum_{i\in C[k]} P_i[k])^2 \rightarrow \text{reference tracking}$$

$$\text{battery wearing} \leftarrow \begin{cases} +c_1(\sum_{i\in C[k]} P_i[k] - \hat{P}_i[k])^2 \lambda_i[k] + \\ \sum_{i\in C[k]} (1 - \omega_i[k])\omega_i[k-1]\rho_i[k]\hat{P}_i^2[k]) \end{cases}$$

$$\text{fair allocation} \leftarrow + \sum_{i\in C[k]} (P_i[k] - P_i^{ref}[k])^2 \quad (11)$$

$$\text{s.t.} \quad P_i^{min}\omega_i[k] \leq P_i[k] \leq P_i^{max}\omega_i[k] \quad (12)$$

$$\omega_i[k] \in \{0, 1\}, \forall i \in C[k] \quad (13)$$

wherein $\tilde{P}^{req}[k] = P^{req}[k] - \Sigma_{i\in\mathcal{L}[k]} P_1[k]$, wherein $\mathcal{L}[k]$ is the collection of EVs that are locked at time k, wherein $\lambda_i[k] \in [0.5, 1]$ per EV i, quantifies how long ago and how large power changes were, and $$\lambda_i[k] = \begin{cases} \lambda_i[k_i'] + \left(\frac{|\hat{P}_i[k] - \hat{P}_i[k_i']|}{P_i^{max}}\right)(1 - \lambda_i[k_i']), \\ \quad \text{if } |\hat{P}_i[k] - P_i[k_i']| > \epsilon \text{ and } k - k_i' < T^L \\ (\lambda_i[k-1] - 0.5)\delta + 0.5, \text{ otherwise.} \end{cases}$$

wherein $P_i^{max}$ is a maximum power that EV i can consume and $k_i'$ is the time of the most recent change of the setpoint for EV i before k, so that $P_i[\kappa] = P_i[k_i']$ for $x =$ $$k_i', k_i' + 1, \ldots, k - 1,$$

and $$\rho_i[k] = 0.5 + \zeta_i[k]/(2 \max_{i\in C[k]} \zeta_i[k]).$$

with the unit-less quantity per EV as follows $$\zeta_i[k] = s_i \frac{1}{P_i^{max}} H\left(\frac{\Delta E_i^{dem}[k_i^{arr}]}{k_i^{dep} - k_i^{arr}}, \frac{\Delta E_i^{dem}[k]}{k_i^{dep} - k}\right),$$

wherein the H represents the harmonic mean, and by property of the harmonic mean, $$\zeta_i[k] \in \left[0, \frac{2s_i \Delta E_i^{dem}[k_i^{arr}]}{P_i^{max}(k_i^{dep} - k_i^{arr})}\right]$$

which depend on initial state of an EV, and, moreover, $\zeta_i[k]$ is monotonically increasing function of $$\frac{\Delta E_i^{dem}[k]}{k_i^{dep} - k},$$

wherein $\Delta E_i^{dem}[k]$ is the remaining energy demand of EV i at time k and expected remaining charging $k - k_i^{dep}$, wherein $s_i > 0$ is the parameter that differentiates service between classes of EVs, whereby at the time k, reference powers, $P_i^{ref}[k] \in [0, P_i^{max}]$ are computed for all EVs, ideally fair such that $\Sigma_{i\in C[k]\cup\mathcal{L}[k]} P_i^{ref}[k] = P^{req}[k]$, thereby minimizing an impact on battery life of EVs.

In a preferred embodiment, the method further comprises formulating a mixed-integer-quadratic program based on integral terms to cope with time-dependent variables $(\rho_i, \lambda_i)$ such as battery wearing, and remaining energy demand.

In a further preferred embodiment, an on/off decision for EV i at time k is denoted by $\omega_i[k]$, and $\omega_i[k] = 1$ (respectively, 0) means a decision to switch on (respectively, off) EV i at time k, and upon arrival, an EV is initially switched off, $\omega_i[k]$ being integer variables. The method further comprises introducing a ranking metric $r_i[k]$, which combines the operational margins with $\mu_i[k]$:

$$r_i[k] = \begin{cases} \frac{\hat{P}_i[k]}{P_i^{max}\mu_i[k]} & \text{if } \Delta P^{req}[k] < 0, \\ \frac{P_i^{max} - \hat{P}_i[k]}{P_i^{max}\mu_i[k]} & \text{otherwise,} \end{cases}$$

wherein $\Delta P^{req}[k] = \tilde{P}^{req}[k] - \Sigma_{i\in C[k]} \hat{P}_i[k]$, The method further comprises implementing a heuristic configured to reduce the number of integer variables to m, thereby reducing a complexity of the optimisation problem and enabling the solving of the optimisation problem in real-time, whereby, if an amount of unlocked EVs is initially less than $m \geq 1$, then all these unlocked EVs are enabled to change their on/off decision, and, otherwise, determined m EVs with a largest metric $r_i$ are taken, whereby a heuristic partitions the collection of unlocked EVs, $C[k]$, into three collections: EVs that are forced to be switched or remain on ($S^{on}[k]$), EVs that are forced to be switched or remain off ($S^{off}[k]$), and EVs for which the on/off decision is decided by the optimization problem ($S[k]$).

In a further preferred embodiment, if $\tilde{P}^{req}[k] \notin [P^{lb}, P^{ub}]$, the method comprises looping until fulfilling a constraint of $\tilde{P}^{req}[k] \in [P^{lb}, P^{ub}]$, wherein $$P^{lb} = \sum_{x\in S^{on}[k]} P_i^{min}, P^{ub} = \sum_{i\in S^{on}[k]\cup S[k]} P_i^{max}.$$

In a further preferred embodiment, if $\tilde{P}^{req}[k]$ lies above the bounds $[P^{lb}, P^{ub}]$, the method comprises a step of forcing the EV from $S[k]$ with highest rank to be switched on, and replacing it with highest ranked EV in $\mathcal{R} = C[k]\backslash S[k]$, thereby automatically increasing $P^{ub}$, to eventually reach $\tilde{P}^{req}[k]$.

In a further preferred embodiment, if $\tilde{P}^{req}[k]$ lies below the bounds $[P^{lb}, P^{ub}]$, the method comprises a step of switching off the highest ranked EV from $\mathcal{S}[k]$, and replacing it with the highest ranked EV in $\mathcal{R}$.

In contrast to prior art, the inventive method does consider the EVs heterogeneity. We do not have any information about future arrivals and departures, nor can we know the amount of time any charging will take.

Furthermore, we consider both switch on and off possibilities and not arbitrarily small minimum charging power.

In order to achieve all these objectives, the invention defines novel metrics and uses them to construct a dedicated optimization problem. As the charging power is discontinuous (the minimum charging power is not arbitrarily small), our optimization problem is mixed integer by nature. Because the mixed-integer optimization is difficult to perform in real-time, we propose a heuristic for reducing the number of integer variables, thus reducing the complexity of the problem.

BRIEF DESCRIPTION OF THE DRAWINGS

The invention will be better understood through the detailed description of preferred embodiments, and in reference to the drawings, wherein FIG. 1 contains a schematic view of a general setup of a charging station according to an example embodiment of the invention;

FIG. 5 describes an example heuristic in from of detailed Algorithm 1.

DETAILED DESCRIPTION OF PREFERRED EMBODIMENTS

In order to achieve all the objectives that the invention aims to, we define novel metrics and use them to construct a dedicated optimization problem. As the charging power is discontinuous (the minimum charging power is not arbitrarily small), our optimization problem is mixed integer by nature. Because the mixed-integer optimization is difficult to perform in real-time, we propose a heuristic for reducing the number of integer variables, thus reducing the complexity of the problem.

In the following sections of the present application, we will describe
 the charging control problem;
 details of the developed control strategy; and
 provision of numerical examples with performance metrics to validate the inventive method.

In general, the approach taken in the context of the invention
 assumes that the control scheme has no internal information about battery charging (e.g., ramping rates, current State-of-Energy), which is more realistic, as modern charging stations are myopic to these kinds of parameters;
 concerns a method that provides sub-second-scale control. Whereas most of the existing methods work on minute scale, ours enables the CS to react faster to changes in the grid;
 makes use of a realistic model for the batteries charging-power, i.e., an EV is either switched off (charging power is 0 W), or its power lies within non-zero bounds;
 minimizes the battery wearing by avoiding large power jumps and reducing the number of cycles;
 assumes that the departure time of an EV is only an estimation, hence we assume that the precise departure time is unknown.

Problem Statement

Charging-Station Model

Figure 1:
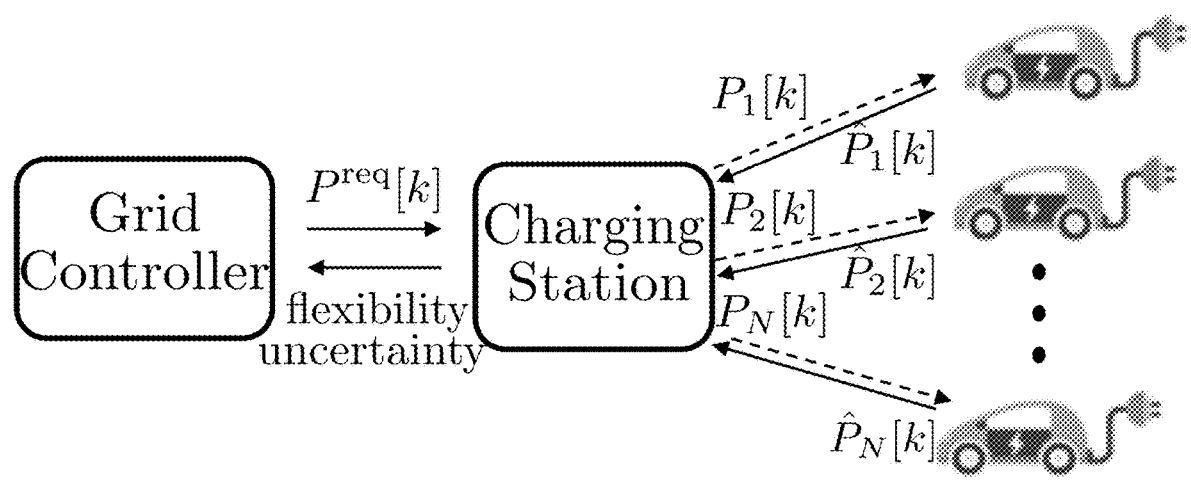

We consider a charging station (CS) that can host N EVs. Time is discretized in constant interval, indexed by k. The CS keeps track of the number of connected EVs at every step k. A newly arrived EV cannot begin charging before being instructed by the CS. Each EV, say i, upon its arrival, is assumed to inform the CS: (i) charging-power bounds $P_i^{min}$ and $P_i^{max}$, (ii) energy demand at arrival $E_i^{dem}$, and (iii) expected departure time $t_i^{dep}$. Information about future arrivals, future expected departures and future demands is unknown. Also, the CS has access to the measured power $\hat{P}_i[k]$ of EV i at every time k. The CS is able to control the charging power of an EV by sending the setpoint $P_i[k]$ to EV i at time k (see FIG. 1). FIG. 1 illustrates a schematic view of a general setup of a charging station according to an example embodiment of the invention. The general setup comprises the charging station to which at least one electrical vehicle is/are connected. The controlling from the charging station of the charging power of any one of the EVs is done by sending respectively setpoint $P_1[k]$, $P_2[k]$, ... $P_N[k]$ as shown by means of the dotted arrows directed to vehicles, and receiving in return corresponding readings $\hat{P}_1[k]$, $\hat{P}_2[k]$, ... $\hat{P}_N[k]$. After informing the grid controller about the readings, the charging station receives from the grid controller in real time an aggregated power-setpoint $P^{req}[k]$, and sends back to the grid controller a flexibility parameter.

The CS receives aggregated setpoints, $P^{req}[k]$, from the grid controller. In return, it sends its updated status that includes its flexibility.

Constraints of the EVs

We assume that the CS has the ability to stop the charge of an EV. Then, the individual power flexibility of EV i is defined by the set $\{0\} \cup [P_i^{min}; P_i^{max}]$. However, EVs cannot immediately change their charging power due to delays:
 reaction delay is the time an EV takes to start modifying its power after receiving a new setpoint,
 implementation delay is the time an EV takes to reach a new setpoint, which depends on the EV charger ramping-rate.

We say that an EV is locked if it is in the process of reacting or implementing a setpoint. As the specific delays are usually different for every type of EV, it is difficult to know their exact values. Therefore, we take a conservative upper bound $T^L$ (20 s in this paper). Namely, we consider that, after receiving a setpoint, any EV will be locked for a locking period $T^L$.

Note that, the locking of the EVs temporarily shrinks the flexibility of the CS, since the amount of EVs that can change power varies from one control cycle to another. Moreover, as the ramping rates and delays are unknown, it is impossible to know exactly how the charging power will change when an EV is locked. This information is supposed to be constantly sent to the grid controller.

Power Allocation of EVs

The CS needs to allocate the time-varying aggregated power-setpoint to the connected EVs. The purpose of the power-allocation strategy is to allocate the consumed power in such a way that the EV demands are satisfied and their batteries are protected. In particular, fast variations of the aggregated setpoint should be smoothed, otherwise its direct implementation can degrade the EV batteries. Summarizing, the objectives of the allocation strategy are:
1) track the external request from a grid operator,
2) minimize the wearing of EV batteries,
3) maximize the EVs energy-demand satisfaction fairly,
4) minimize the number of times the charging station stops the charging of an EV, while it is plugged-in.

The present invention considers all four objectives together. In the next section we formulate a specific mixed-integer program and show how we solve it in real-time.

Control Scheme

The control scheme computes setpoints for all EVs that are not locked at time k. Let us introduce some notations that will help us formulating the optimization problem.

$\mathcal{C}$ [k] is the collection of EVs that are unlocked at time k, just before starting a new computation of setpoints.
$\mathcal{L}$ [k] is the collection of EVs that are locked at time k.
$\mathcal{P}$ [k] is the collection of setpoints that will be computed for each EV in $\mathcal{C}$ [k].

As introduced previously herein above, an EV i can receive setpoints in the set $\{0\} \cup [P_i^{min}; P_i^{max}]$. We denote the on/off decision for EV i at time k by $\omega_i[k]$. Specifically, $\omega_i[k]=1$ (respectively, 0) means that we decide to switch on (respectively, off) EV i at time k. Upon arrival, we assume that an EV is initially switched off. Then, let $\Omega[k]$ be the collection of on/off decisions that will be computed for each EV in $\mathcal{C}$ [k]. Our task is to find the collection of setpoints $\mathcal{P}$ [k] and decisions $\Omega[k]$, while minimizing the objectives described in Section II. To this end we introduce the following objective function $$\min_{\mathcal{P}[k], \Omega[k]} c_0 f_0(\mathcal{P}[k]) + c_1 (f_1(\mathcal{P}[k]) + f_2(\Omega[k])) + f_3(\mathcal{P}[k]), \quad (1)$$

where $f_0$, $f_1$, $f_2$, $f_3$ are quadratic functions, and parameters $c_0$, $c_1 > 0$ which will be described in next subsections. Note that, this control scheme is a mixed-integer problem due to the presence of the collection of binary control variables $\Omega[k]$.

Aggregated Power-Setpoint Tracking

The first term in (1) is responsible for tracking the aggregated power-setpoint $P^{req}[k]$. As, in general, some EVs are locked, our goal is to track the aggregated setpoint by changing the power of the unlocked EVs in $\mathcal{C}$ [k], while taking into account the locked EVs in $\mathcal{L}$ [k]. As the locked EVs are either reacting to or implementing a previous setpoint, they should be removed from the aggregated setpoint, i.e. $\tilde{P}^{req}[k] = P^{req}[k] - \Sigma_{i \in \mathcal{L}[k]} P_i[k]$. In this case, $P_i[k]$ represents the very last setpoint that a locked EV has received. This impedes the CS to reallocate the same power in the unlocked EVs. Finally, $f_0$ can be expressed as $$f_0(\mathcal{P}[k]) = \left(\tilde{P}^{req}[k] - \sum_{i \in \mathcal{C}[k]} P_i[k]\right)^2 \quad (2)$$

Battery Wearing

In order to minimize the impact of changing power in the EV batteries, we use $f_1$ and $f_2$ in the objective function. $f_1$ penalizes the deviation between the setpoint and the measured power, together with the changes in the measured power. $f_2$ penalizes sudden switch off of the EVs caused by the CS. To formalize $f_1$ and $f_2$, let us introduce new variables. As our method is online, we introduce two non-linear integral terms to account for (i) the past behaviour of EVs charging power, and (ii) the desire of an EV to be charged.

The first of these terms, $\lambda_i[k] \in [0.5, 1]$ per EV i, quantifies how long ago and how large power changes were. This is used as a priority metric: the smaller $\lambda_i$, the more priority to change power. Let $k_i'$ be the time of the most recent change of the setpoint for EV i before k (so that $P_i[\kappa]=P_i[k_i']$ for $x=k_i', k_i'+1, \ldots, k-1$). Note that, $k_i'$ is function of k as well but, for the ease of notation, we drop this dependency. When EV i arrives, $P_i[k_i']$ is set to zero. Consequently, we take $$\lambda_i[k] = \begin{cases} \lambda_i[k_i'] + \left(\frac{|\hat{P}_i[k] - \hat{P}_i[k_i']|}{P_i^{max}}\right)(1 - \lambda_i[k_i']), \\ \quad \text{if } |\hat{P}_i[k] - P_i[k_i']| > \epsilon \text{ and } k - k_i' < T^L \\ (\lambda_i[k-1] - 0.5)\delta + 0.5, \text{ otherwise.} \end{cases} \quad (3)$$

Figure 2:
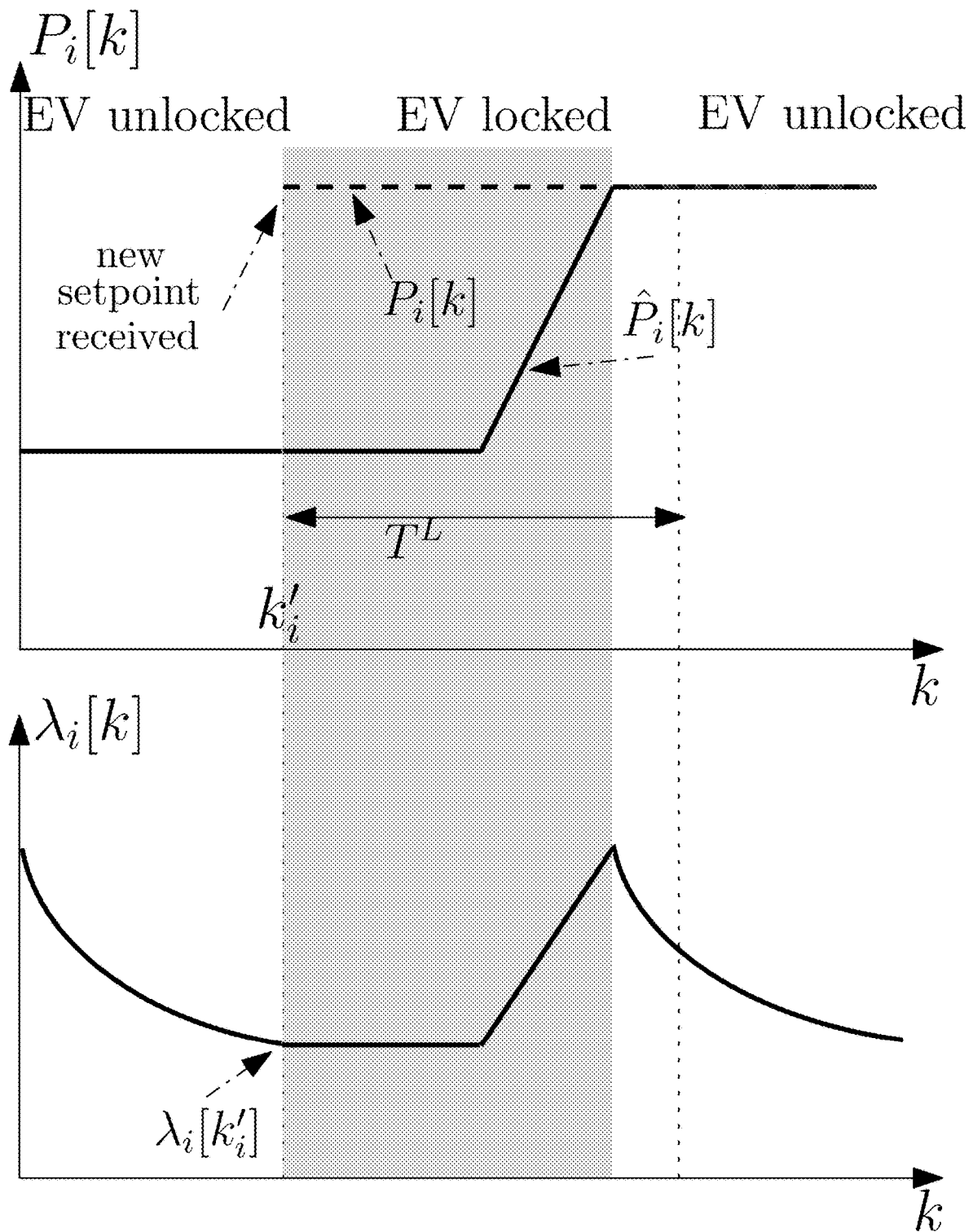
FIG. 2 shows a curve representative of an evolution of $\lambda_i[k]$.

We now refer to FIG. 2 which shows a curve representative of an evolution of $\lambda_i[k]$ in the lower part of the page, and in the upper half of the page, with same position of the k-axis, a curve of an evolution of setpoint $P_i[k]$. Different zones separated by dotted lines represent cases where the EV is unlocked or locked. The first case of Eq. (3) occurs when EV i is locked and the setpoint is not yet implemented. In this case, $\lambda_i[k]$ increases linearly with respect to the implemented power change (grey area on FIG. 2). It is defined by the following conditions, first case (i) and second case (ii):

$$\text{if } \hat{P}_i[k] = \hat{P}_i[k_i'], \text{ then } \lambda_i[k] = \lambda_i[k_i'], \text{ and} \quad (i)$$

$$\text{if } |\hat{P}_i[k] - \hat{P}_i[k_i']| = P_i^{max}, \lambda_i[k] = 1. \quad (ii)$$

In the second case, $\lambda_i[k]$ i decreases exponentially with a decay $\delta$ (see FIG. 2). Observe that the right-hand side of Eq. (3) is always in [0.5, 1]. $f_1$ uses the term $P_i[k]-\hat{P}_i[k]$ and $f_1$ ($\mathcal{P}$ [k]) as follows $$f_1(\mathcal{P}[k]) = \sum_{i \in \mathcal{C}[k]} (P_i[k] - \hat{P}_i[k])^2 \lambda_i[k]. \quad (4)$$

The second term, $\rho_i[k] \in [0.5, 1]$, expresses the desire of an EV i to charge. It is also used as a priority metric: the larger the $\rho_i$ the more priority to increase the power. Note that, the CS can keep track of the remaining energy demand $\Delta E_i^{dem}$ [k] of EV i at time k, and expected remaining charging $k-k_i^{dep}$. Therefore at time k, the CS computes the power that EV i needs to satisfy its demand as $$\frac{\Delta E_i^{dem}[k]}{k_i^{dep} - k}.$$

Additionally for $k=k_i^{arr}$ this power equals to $$\frac{\Delta E_i^{dem}[k_i^{arr}]}{k_i^{dep} - k_i^{arr}}.$$

With this, we compute the unit-less quantity per EV as follows $$\zeta_i[k] = s_i \frac{1}{P_i^{max}} H\left(\frac{\Delta E_i^{dem}[k_i^{arr}]}{k_i^{dep} - k_i^{arr}}, \frac{\Delta E_i^{dem}[k]}{k_i^{dep} - k}\right), \quad (5)$$

where H represents the harmonic mean and $s_i > 0$ is the parameter that differentiates service between classes of EVs. By property of the harmonic mean, $$\zeta_i[k] \in \left[0, \frac{2s_i \Delta E_i^{dem}[k_i^{arr}]}{P_i^{max}(k_i^{dep} - k_i^{arr})}\right] \quad (15)$$

which depend on initial state of an EV. Moreover, $\zeta_i[k]$ is monotonically increasing function of $$\frac{\Delta E_i^{dem}[k]}{k_i^{dep} - k}.$$

Consequently, we take $$\rho_i[k] = 0.5 + \zeta_i[k] / (2 \max_{i \in C[k]} \zeta_i[k]). \quad (6)$$

$f_2$, which penalizes the switch off of EVs, is expressed as $$f_2(\Omega[k]) = \sum_{i=1}^{} (1 - \omega_i[k])\omega_i[k-1]\rho_i[k]\hat{P}_i^2[k]. \quad (7)$$

We multiply each term by $\rho_i[k]$ to enforce EVs with larger values to be switched off at last. We also multiply by $\omega_i[k-1]$ to exclude EVs that are switched off.

Fair Allocation of Charging Power

One of the aims of the invention is that the aggregated power that must be allocated among EVs is driven by $P^{req}$. In order to anticipate the future information, we allocate the power by using $\zeta_i$ as a weight for EV i. To this end, at time k, we compute reference powers, $P_i^{ref}[k] \in [0, P_i^{max}]$ for all EVs, ideally fair such that $\sum_{i \in C[k] \cup L[k]} P_i^{ref}[k] = P^{req}[k]$. Commonly used fair allocations are weighted-proportional and weighted-max-min [22]

Figure 3:
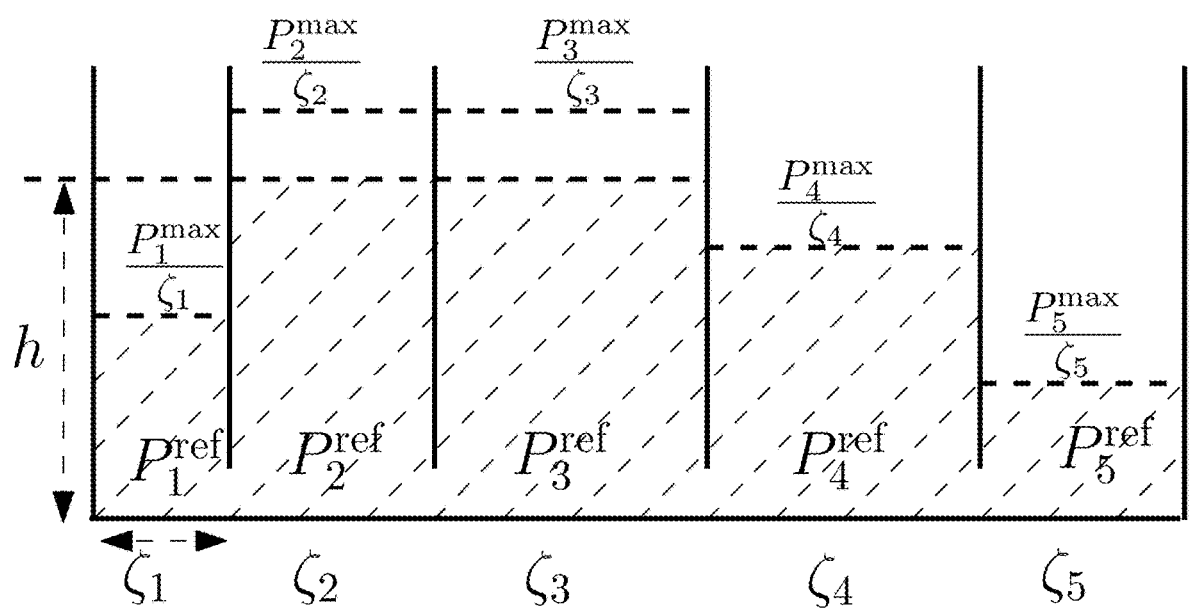
FIG. 3 illustrates a result of water-filling algorithm for 5 EVs, wherein EVs 1, 4 and 5 are fully filled, whereas 2 and 3 have reference powers of $h\zeta_2$ and $h\zeta_3$ respectively.

Let us first describe the weighted-max-min fair allocation. As the set of constraints is convex and compact (i.e., closed and bounded in Euclidean space), we know that this allocation exists and is unique [22]. In order to find such an allocation, the water-filling algorithm is used, which works as follows. The power of all EVs is increased at the same pace, until one or more powers reach their maximum. The powers that reach their maximum are frozen, and the others continue to increase at the same pace. The algorithm is repeated until $\sum_{i \in C \cup L} P_i^{ref} = P^{req}$ (from here on, the time index k is omitted for simplicity of notation). For details, see FIG. 3. Here, we use again $\zeta_i$ to prioritize the EVs that need to be charged to satisfy their demand. Each EV i is represented as a water tank of width $\zeta_i$ and height $$\frac{P_i^{max}}{\zeta_i}.$$

The volume of water in the tank is either $P_i^{max}$ or $h\zeta_i$, where h is the common height of the non-saturated tanks. The result of the water-filling algorithm is illustrated for 5 EVs. EVs 1, 4 and 5 are fully filled, so their reference powers are $P_1^{max}$, $P_4^{max}$ and $P_5^{max}$ respectively, whereas 2 and 3 have reference powers of $h\zeta_2$ and $h\zeta_3$ respectively.

Another possibility is to consider weighted-proportional fairness. We find a proportionally fair allocation of power by solving the following convex optimization-problem in (A):

(A)

$$\max_{P^{ref}} \sum_i \zeta_i \log P_i^{ref}$$

$$\text{s.t.} \quad 0 < P_i^{ref} \leq P_i^{max} \quad (8)$$

$$\sum_i P_i^{ref} = P^{req} \quad (9)$$

Full Formulation

By combining (1), (2), (4), (7), (10) with constraints, the optimisation problem to be solved, at each time k, is:

(P)

$$\min_{P_i[k], \omega_i[k]} c_0\left(\tilde{P}^{req}[k] - \sum_{i=1}^{} P_i[k]\right)^2 \rightarrow \text{reference tracking}$$

$$\text{battery} \leftarrow \begin{cases} +c_1\left(\sum_{i=1}^{}(P_i[k] - \hat{P}_i[k])^2 \lambda_i[k] + \\ \sum_{i=1}^{}(1 - \omega_i[k])\omega_i[k-1]\rho_i[k]\hat{P}_i^2[k]\right) \end{cases}$$

$$\text{fair allocation} \leftarrow +\sum_{i=1}^{}\left(P_i[k] - P_i^{ref}[k]\right)^2 \quad (11)$$

$$\text{s.t.} \quad P_i^{min}\omega_i[k] \leq P_i[k] \leq P_i^{max}\omega_i[k] \quad (12)$$

$$\omega_i[k] \in \{0, 1\}, \forall i \in C[k] \quad (13)$$

Real-Time Implementation Aspects

Reducing the Number of Integer Variables

Since (P) is mixed integer, its complexity grows exponentially with the number of integer variables [23] (here $\omega_i$). To reduce the problem complexity, we propose a heuristic, that runs every time k, which limits the number of integer variables. The heuristic partitions the collection of unlocked EVs, $C$ [k], into three collections: EVs that are forced to be switched (or remain) on ($S^{on}[k]$), EVs that are forced to be switched (or remain) off ($S^{off}[k]$), and EVs for which the on/off decision is decided by the optimization problem ($S$ [k]). We require that $|S[k]| \leq m$, where m is fixed small number.

In other words, we define a new problem (H) that at most m integer variables. All other $\omega_i[k]$ remain fixed.

(H)

$$\min_{P_i[k], \omega_i[k]} \quad (11)$$

$$\text{s.t.} \quad (12, 13)$$

$$\omega_i[k] = 1, \forall i \in S^{on}[k], \omega_j[k] = 0, \forall j \in S^{off}[k] \quad (14)$$

The constraints in (14) force the EVs to be switched on/off.

Note that, with this consideration, the flexibility that the problem (H) considers is, however, smaller than that of (P). Namely, the power to be allocated among the unlocked EVs, $\tilde{P}^{req}[k]$, may not be able to be tracked, depending on the partition of $\mathcal{C}$. Let us thus define the full flexibility of the CS at time k, as $\mathcal{F}$ (see Section V-B), and the reduced flexibility (the one available for (H)), as the interval $[P^{lb}, P^{ub}]$ with $$P^{lb} = \sum_{i \in \mathcal{C} \setminus \mathcal{S}} P_i^{min}, \quad P^{ub} = \sum_{i \in \mathcal{C} \setminus \mathcal{S}} P_i^{max}. \quad (15)$$

Thus, the partition $\{\mathcal{S}[k], \mathcal{S}^{on}[k], \mathcal{S}^{off}[k]\}$ should ensure that $\tilde{P}^{req} \in [P^{lb}, P^{ub}]$. Note that, we compute the bounds excluding locked EVs. Their power is already defined as explained in Section III-C.

We now describe the heuristic, detailed in Algorithm 1, reproduced in FIG. 5. First, we define a metric that takes into account both the past behaviour of the EVs power and their desire to be charged, as follows:

$$\mu_i[k] = \lambda_i[k] + (1 - \omega_i[k-1])(1.5 - \rho_i[k]) + \omega_i[k-1]\rho_i[k], \quad (16)$$

with $\mu_i[k] \in [1, 2]$, unit-less, and consisting of three parts:
- $\lambda_i[k]$ contains information about the past behaviour of the charging power. Smaller $\lambda_i[k]$ means that EV i is more propense to change its power,
- $(1-\omega_i[k-1])(1.5-\rho_i[k])$ identifies the propensity of a switched-off EV to switch on,
- $\omega_i[k-1]\rho_i[k]$ identifies the propensity of a switched-on EV to switch off.

Therefore, $\mu_i[k]$ quantifies the propensity of EV i to change its on/off decision and charging power. Smaller $\mu_i[k]$ indicates more propensity.

Second, we rank the EVs according to their individual operational margins. Since the maximum power of EV i can consume is $P_i^{max}$ and the minimum is 0, its positive margin $P_i^{max} - \hat{P}_i[k]$ and its negative margin is $\hat{P}_i[k]$. Dividing these values by $P_i^{max}$ we get normalized margins. We hence introduce the ranking metric $r_i[k]$, which combines the operational margins with $\mu_i[k]$:

$$r_i[k] = \begin{cases} \dfrac{\hat{P}_i[k]}{P_i^{max} \mu_i[k]} & \text{if } \Delta P^{req}[k] < 0, \\ \dfrac{P_i^{max} - \hat{P}_i[k]}{P_i^{max} \mu_i[k]} & \text{otherwise,} \end{cases} \quad (17)$$

where $\Delta P^{req}[k] = \tilde{P}^{req}[k] - \Sigma_{i \in \mathcal{C}[k]} \hat{P}_i[k]$. Finally, we define the function (top($\mathcal{X}$, m)) that returns the index of the m elements with the largest $r_i[k]$ metric, from a collection $\mathcal{X}$. In rest of this section, we omit the time index k for sake of clarity.

The goal of the heuristic is to limit the number of integer variables to m. If the amount of unlocked EVs is initially less than m, then all these EVs can change their on/off decision (lines 2-3). Otherwise, we take the m EVs with the largest metric $r_i$ (lines 5-8). This choice is sufficient in most of the cases since, according to $r_i$, these EVs are the best to be selected. However, it can happen that $\tilde{P}^{req}[k] \notin [P^{lb}, P^{ub}]$, in which case we loop until fulfilling this constraint. If $\tilde{P}^{req}$ lies above the bounds, we force the EV from $\mathcal{S}$ with highest rank to be switched on, and replace it with highest ranked EV in $\mathcal{R} = \mathcal{C} \setminus \mathcal{S}$ (lines 12-14, 18-19). Doing this, we automatically increase $P^{ub}$, eventually reaching $\tilde{P}^{reg}$ (see Theorem 2 herein below). Similarly, if $\tilde{P}^{req}$ lies below the bounds, we switch off the highest ranked EV from $\mathcal{S}$ (lines 15-17) and replace it with the highest ranked EV in $\mathcal{R}$.

Theorem 2, which expresses a correctness of the heuristics, is as follows:
given that m≥1, Alg. 1 finds the partition $\mathcal{S}, \mathcal{S}^{on}, \mathcal{S}^{off}$ of $\mathcal{C}$, such that $\tilde{P}^{req} \in [P^{lb}, P^{ub}]$, $|\mathcal{S}| \leq m$. Alg. 1 takes at most $|\mathcal{C}|-m$ iterations.

Validation

Figure 4:
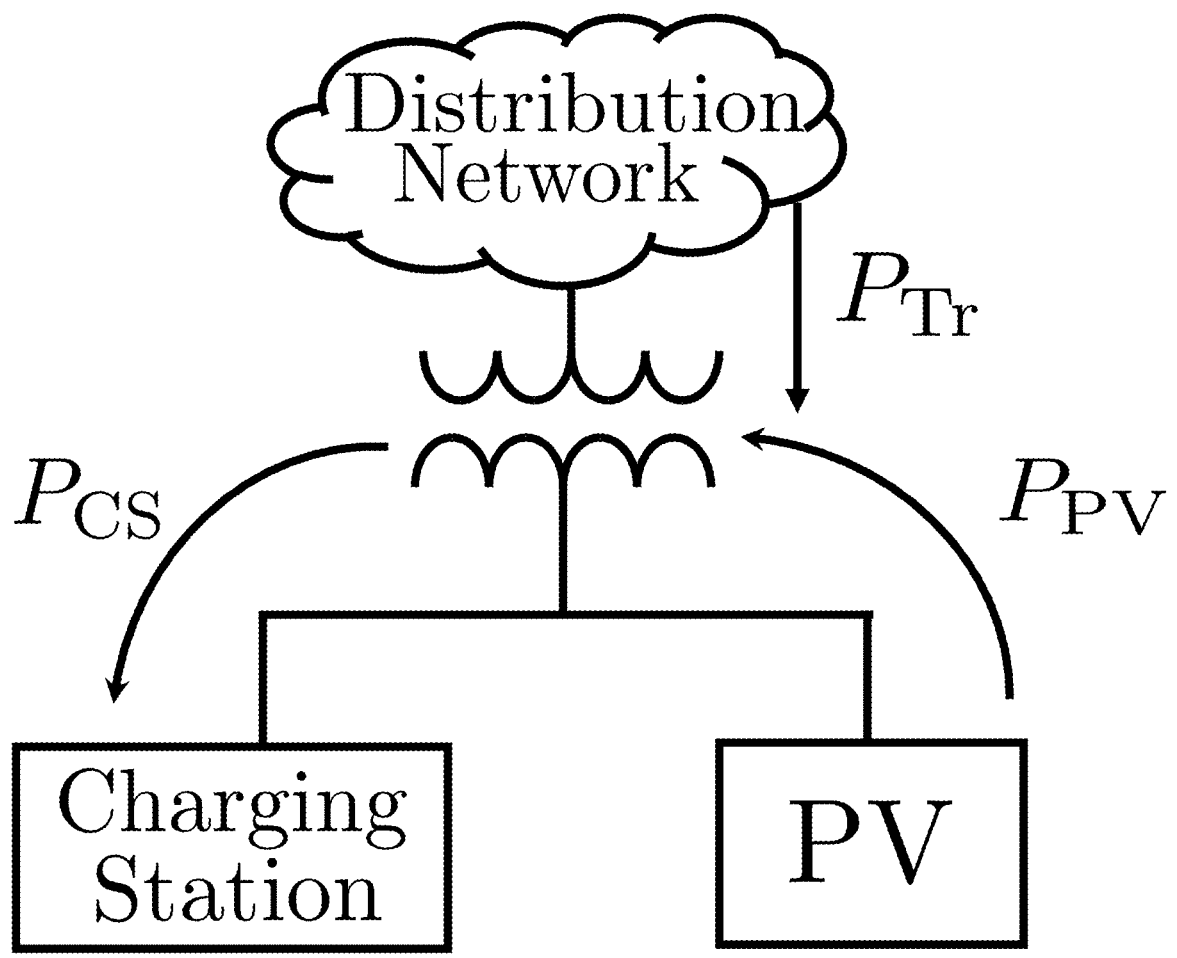
FIG. 4 shows a schematic representation of a structure of a grid, the arrows showing positive directions of corresponding active-power flows.

For a validation of the method according to the invention, we consider a grid with an existing 500 kWp PV plant connected to the distribution network through a power transformer rated $S_{Tr}^r$=500 kVA (note that we do not consider grid constraints other than the transformer rated power). We claim that, in such setup, we can install a charging station (CS) of $P_{CS}^r$=1000 kW power rating. Referring to FIG. 4, this illustrates an example structure of the grid, in which the arrows show the positive directions of the corresponding active-power flows. Also FIG. 4 provides proof of S4. (a) $\tilde{P}_{req} < P^{lb,(\ell)}$ (visiting line 14), then it is impossible that $P^{ub,(\ell-1)} < \tilde{P}_{req} < P^{lb,(\ell)}$. (b) Similarly, if $\tilde{P}_{req} > P^{lb,(\ell)}$ (visiting line 16), it is impossible that $P^{lb,(\ell)} < \tilde{P}_{req} < P^{ub,(\ell-1)}$. Moreover, we consider that the CS is composed by 60 slots of 22 kW max. This is a stress test for our method since we will force the CS to opportunistically use the maximum available power.

To simulate the PV production, we use irradiance measurements taken in the Authors laboratory, which are then scaled according to the PV rated power. We simulate the arrival of EVs to the CS as a homogeneous Poisson process with rate 30 arrivals/hour. We assume that, upon arrival (at $k_i^{arr}$), EV i informs its energy-demand $E_i$ and the expected departure-time $k_i^{dep}$. We model the staying time $(k_i^{dep} - k_i^{arr})$ to be uniformly distributed between 1.5 and 1.6 hours. Furthermore, we consider that a user will not necessarily leave at precisely the informed time. The real staying-time is also modelled with the same distribution. An EV will leave after the real staying-time regardless of its level of charge. Given the distributions of the arrival time and the staying time, it is highly likely that an EV will find an available slot upon arrival, otherwise this EV is ignored (since in practice this EV will leave for another charging station). In all our simulation scenarios, this property was maintained. We consider two groups of EVs: group A with high and group B with low energy-demand. The demand is uniformly distributed between 28 and 32 kWh and between 3 and 5 kWh respectively. Considered reaction times are also uniformly distributed between 2 and 3 s and the ramping rate is 5 kW/s (this rate was taken according to the maximum charging power, such that the EV will reach its maximum power before locking period finishes). The minimum and maximum powers of the modelled EVs are 2 kW and 22 kW.

We consider 3 scenarios, mainly defined by the PV trace, that are representative enough to show all our method features:
- regular production, when the PV production is smooth,
- sharp jump, when, for emergency reasons, part of the PV plant is suddenly disconnected, and
- fluctuating production, when the PV production is characterized by large fluctuations.

We also analyze the influence of different combinations of weights $c_o$, $c_1$ on the performance of our method.

Model of the Grid Controller

We next describe the way we model the decision of the grid controller. We assume that all resources are connected to the same node, thus simplifying the power-balance equation to $P_{Tr}=P_{CS}-P_{PV}$, being $P_{Tr}$ the transformer, $P_{PV}$ the PV plant and $P_{CS}$ the charging station powers respectively. The control variable is $P_{CS}$, while the controlled variable is $P_{Tr}$. The goal of this controller is to maximize PCS, while trying to avoid the violation of the transformer rated power, i.e., $|P_{Tr}|\leq S_{Tr}^r$, subject to the uncertainty produced by (i) the variation of the injected PV power and (ii) the charging of locked EVs. We focus on the case when the violation is produced by an overconsumption of the CS. The case when the violation is produced by an overproduction of the PV plant can be handled similarly. Hence, the controller decision is computed as $$P^{req} = P_{Tr}^r + P_{PV}^\downarrow - \Delta P_{CS}^\uparrow, \tag{18}$$

where $P_{PV}^\downarrow$ is the one-step-ahead minimum expected PV production, computed by a short-term forecasting tool [10]. $\Delta P_{CS}^\uparrow$ is the maximum possible consumption increment of locked EVs, i.e., the difference between their individual setpoint and their current measured power $$\Delta P_{CS}^\uparrow = \sum_{i\in\mathcal{L}^\uparrow} P_i - \hat{P}_i, \quad \mathcal{L}^\uparrow = \{i \in \mathcal{L} \,|\, P_i - \hat{P}_i \geq 0\}. \tag{19}$$

This term accounts for the uncertainty of EVs at implementing a setpoint due to the unknown ramping properties of each EV. Finally, the computed setpoint is saturated depending on the current flexibility of the CS, computed by the CS itself and sent to the grid controller, represented by the interval $$\mathcal{F} = \left[\sum_{i\in\mathcal{L}}P_i, \ \min\left(\sum_{i\in\mathcal{L}}P_i + \sum_{i\in C}P_i^{max}, \ P_{CS}^r\right)\right]. \tag{20}$$

It is worth noting that the flexibility is lower bounded by the locked EVs and upper bounded by the maximum power of the unlocked EVs. The flexibility is not limited by the minimum power and the handling of any setpoint below $$\min_i P_i^{min}$$

is ensured ay Algorithm 1. Besides, the controller cannot ensure to avoid the violation transformer rated-power violation due to the ramping mechanism of the locked EVs, but, in the worst-case scenario, it will take a time $T^L$ (locking period) to regain more flexibility, thus decreasing the consumption.

Performance Evaluation Metrics

As our optimization problem in (H) is multi-objective, we define the following metrics for the performance evaluation:
  follow-request—measures how well a CS follows the aggregated setpoint $$M^{fr} = \frac{1}{K}\sum_{k=1}^{K}|P^{req}[k] - \hat{P}[k]| \tag{21}$$

where K is the amount of discrete time-steps during the selected control period and $\hat{P}[k]= \Sigma_{i\in\mathcal{C}[k]\cup\mathcal{L}[k]}\hat{P}_i[k]$. This metric is lower bounded by 0. Then, the close $M^{fr}$ is to 0, the better the CS follows the aggregated setpoint.
  non-satisfied demand—measures how well the charging demand of EV i is satisfied $$M_i^{nsd} = \Delta E_i[k_i^{stop}]/\Delta E_i[k_i^{arr}] \tag{22}$$

where $\Delta E_i[k_i^{stop}]$ is the energy that remains to be satisfied at departure time, and $\Delta E_i[k_i^{arr}]$ is the initial energy demand. $M_i^{nsd}\in[0, 1]$.
  battery-wearing measures—the changes of the charging power $$M_i^{bw} = \frac{1}{2(P_i^{max})^2}\sum_{k=1}^{K}(P_i[k] - P_i[k-1])^2 \tag{23}$$

This metric shows the impact of the control scheme into the battery life. The closer $M_i^{bw}$ to 0, the less impact.
  violation—measures the violation of the transformer capacity limit $$M^{viol} = \left(\sum_{k=1}^{K}(\hat{P}[k] - P_{Tr}^r - P_{PV}[k])\mathbb{1}_{\{\hat{P}[k]-P_{PV}[k]\geq P_{Tr}^r\}}\right)/P_{Tr}^r \tag{24}$$

The metric is lower bounded by 0, meaning that no violation of the transformer limit occurred.

Simulation Findings

Our finding is that for all scenarios, the combination of weights $c_0=1$, $c_1=10$ dominates among others.

CONCLUSION

The invention proposes a control scheme for controlling the charging of electric vehicles connected to a single charging station, while following an aggregated power-setpoint in real time. When tracking the power setpoint, the overall consumed power is allocated fairly among the connected EV, minimizing the impact on the battery life. Specifically, we formulate a mixed-integer-quadratic program based on novel integral terms to cope with time-dependent variables such as battery wearing and remaining energy-demand. In addition, the invention proposes a heuristic that reduces the number of integer variables in order to reduce the problem complexity, allowing it to be solved in real time.

REFERENCES

[1] D. Block, J. Harrison, and P. Brooker, "Electric Vehicle Sales for 2014 and Future Projections," Florida Solar Energy Center, March 2015.

[2] K. Clement, E. J. Haesen, and J. Driesen, "Coordinated charging of multiple plug-in hybrid electric vehicles in residential distribution grids," Proc. Power Syst. Conf. Expo., pp. 1-7, 2009.

[3] J. A. P. Lopes, F. J. Soares, and P. M. R. Almeida, "Integration of electric vehicles in the electric power system," proc. IEEE, vol. 99, no. 1, pp. 168-183, January 2011.

[4] G. A. Putrus, P. Suwanapingkarl, D. Johnston, E. C. Bentley, and M. Narayana, "Impact of electric vehicles on power distribution net-works," IEEE Vehicle Power and Propulsion Conference, September 2009.

[5] P. B. Evans, S. Kuloor, and B. Kroposki, "Impacts of plug-in vehicles and distributed storage on electric power delivery networks," IEEE Vehicle Power and Propulsion Conference, September 2009.

[6] C. Dharmakeerthi, N. Mithulananthan, and T. Saha, "Impact of electric vehicle fast charging on power system voltage stability," Electrical Power and Energy Systems, vol. 57, pp. 241-249, 2014.

[7] J. Pillai and B. Bak-Jensen, "Impacts of electric vehicle loads on power distribution systems," IEEE Vehicle Power and Propulsion Conf., 2010.

[8] L. Fernandez,' T. San Roman, R. Cossent, C. Domingo, and P. Frias, "Assessment of the impact of plug-in electric vehicles on distribution networks," IEEE Trans. on Power Sys., vol. 26, no. 1, pp. 206-213, 2011.

[9] S. Acha, T. Green, and N. Shah, "Effects of optimised plug-in hybrid vehicle charging strategies on electric distribution network losses," IEEE PES T&D 2010, April 2010.

[10] E. Scolari, D. Torregrossa, J.-Y. Le Boudec, and M. Paolone, "Ultra-short-term prediction intervals of photovoltaic AC active power," Inter-national Conf. on Prob. Methods Applied to Power Systems, October 2016.

[11] A. Bernstein, L. Reyes-Chamorro, J.-Y. Le Boudec, and M. Paolone, "A composable method for real-time control of active distribution networks with explicit power set points. Part I: Framework," Electric Power Systems Research, vol. 6, no. August, pp. 254-264, 2015.

[12] E. Sotromme and M. A. El-Sharkawi, "Optimal scheduling of vehicle-to-grid energy and ancillary services," IEEE Transactions on Smart Grid, vol. 3, no. 1, pp. 351-359, March 2012.

[13] M. Liu, P. McNamara, and S. McLoone, "Fair charging strategies for EVs connected to a low-voltage distribution network," IEEE PES ISGT Europe, 2013.

[14] S. Xie, W. Zhong, K. Xie, R. Yu, and Y. Zhang, "Fair energy scheduling for vehicle-to-grid networks using adaptive dynamic programming," IEEE Trans. on Neural Networks and Learning Systems, vol. 27, no. 8, pp. 1697-1707, 2016.

[15] S. Vandael, B. Claessens, M. Hommelberg, T. Holvoet, and G. Decon-inck, "A scalable three-step approach for demand side management of plug-in hybrid vehicles," IEEE Trans. on Smart Grid, vol. 4, no. 2, pp. 720-728, 2013.

[16] S. Deilami, A. Masoum, P. Moses, and M. A. S. Masoum, "Real-time coordination of plug-in electric vehicle charging in smart grids to minimize power losses and improve voltage profile," IEEE Trans. on Smart Grid, vol. 2, no. 3, pp. 456-467, 2011.

[17] Z. Ma, D. Callaway, and I. Hiskens, "Decentralized charging control of large populations of plug-in electric vehicles," IEEE Trans. on Control Sys. Tech., vol. 21, no. 1, pp. 67-78, 2013.

[18] Y. He, B. Venkatesh, and L. Guan, "Optimal scheduling for charging and discharging of electric vehicles," IEEE Trans. on Smart Grid, vol. 3, no. 3, pp. 1095-1105, 2012.

[19] L. Gan, U. Topcu, and S. Low, "Optimal decentralized protocol for electric vehicle charging," IEEE Trans. on Power Systems, vol. 28, no. 2, pp. 940-951, 2013.

[20] Y. Mou, H. Xing, Z. Lin, and M. Fu, "Decentralized optimal demand-side management for phev charging in a smart grid," IEEE Trans. on Smart Grid, vol. 6, no. 2, pp. 726-736, 2015.

[21] M. Liu, S. McLoone, S. Studli, R. Middleton, R. Shorten, and J. Braslays, "On-off based charging strategies for EVs connected to a low voltage distribution network," IEEE PES APPEEC, 2013.

[22] B. Radunovic and J.-Y. Le Boudec, "A unified framework for max-min and min-max fairness with applications," IEEE/ACM Trans. on Net., vol. 15, no. October, pp. 1073-1083, 2007.

[23] F. S. Hillier and G. J. Lieberman, Introduction to Operations Research. McGraw-Hill, 2010

The invention claimed is:

1. A method for controlling the charging of at least an electrical vehicles (EVs) connected to a single charging station (CS), whereby the at least one electrical vehicle may be either locked or unlocked, an EV being locked if it is in the process of reacting or implementing a setpoint, the method comprising continuously tracking at the charging station of a number of the at least one electric vehicle connected;

controlling from the charging station a charging power of each EV by sending a setpoint $P_i[k]$ to an EV i at time k;

receiving at the charging station a measured power $\hat{P}_i[k]$ from each EV i at time k, computing at a grid controller for all EVs that are not locked at the time k, an aggregated power-setpoint $P^{req}[k]$ in real time;

receiving at the charging station the aggregated power-setpoint $P^{req}[k]$ at any time k;

sending from the charging station to the grid controller a charging station power flexibility interval, the latter being a power range which the charging station is configured to implement;

allocating an overall consumed power fairly among the connected EVs by solving the following optimisation problem:

$$(P) \min_{P_i[k], \omega_i[k]} c_0 \left( \tilde{P}^{req}[k] - \sum_{i \in C[k]} P_i[k] \right)^2 \to \text{reference tracking} \quad (11)$$

$$\text{battery wearing} \leftarrow \begin{cases} +c_1 \left( \sum_{i \in C[k]} (P_i[k] - \hat{P}_i[k])^2 \lambda_i[k] + \right. \\ \left. \sum_{i \in C[k]} (1 - \omega_i[k])\omega_i[k-1]\rho_i[k]\hat{P}_i^2[k] \right) \end{cases}$$

$$\text{fair allocation} \leftarrow + \sum_{i \in C[k]} (P_i[k] - P_i^{ref}[k])^2 \quad (11)$$

$$\text{s.t. } P_i^{min}\omega_i[k] \le P_i[k] \le P_i^{max}\omega_i[k] \quad (12)$$

$$\omega_i[k] \in \{0, 1\}, \forall i \in C[k] \quad (13)$$

wherein $\tilde{P}^{req}[k] = P^{req}[k] - \sum_{i \in \mathcal{L}[k]} P_i[k]$, wherein $\mathcal{L}[k]$ is the collection of EVs that are locked at time k, wherein $\lambda_i[k] \in [0.5, 1]$ per EV i, quantifies how long ago and how large power changes were, and $$\lambda_i[k] = \begin{cases} \lambda_i[k_i'] + \left(\dfrac{|\hat{P}_i[k] - \hat{P}_i[k_i']|}{P_i^{max}}\right)(1 - \lambda_i[k_i']), \\ \quad \text{if } |\hat{P}_i[k] - P_i[k_i']| > \epsilon \text{ and } k - k_i' < T^L \\ (\lambda_i[k-1] - 0.5)\delta + 0.5, \text{ otherwise} \end{cases}$$

wherein $P_i^{max}$ is a maximum power that EV i can consume and $k_i'$ is the time of the most recent change of the setpoint for EV i before k, so that $P_i[k]=P_i[k_i']$ for $x=k_i', k_i'+1, \ldots, k-1$,
and $$\rho_i[k] = 0.5 + \zeta_i[k] \bigg/ \left(2 \max_{i \in C[k]} \zeta_i[k]\right).$$

with the unit-less quantity per EV as follows $$\zeta_i[k] = s_i \frac{1}{P_i^{max}} H\left(\frac{\Delta E_i^{dem}[k_i^{arr}]}{k_i^{dep} - k_i^{arr}}, \frac{\Delta E_i^{dem}[k]}{k_i^{dep} - k}\right),$$

wherein the H represents the harmonic mean, and by property of the harmonic mean, $$\zeta_i[k] \in \left[0, \frac{2 s_i \Delta E_i^{dem}[k_i^{arr}]}{P_i^{max}(k_i^{dep} - k_i^{arr})}\right]$$

which depend on an initial state of an EV, and moreover, $\zeta_i[k]$ is monotonically increasing function of $$\frac{\Delta E_i^{dem}[k]}{k_i^{dep} - k},$$

wherein $\Delta E_i^{dem}[k]$ is the remaining energy demand of EV i at time k and expected remaining charging $k-k_i^{dep}$,
wherein $s_i > 0$ is the parameter that differentiates service between classes of EVs,
whereby at the time k, reference powers, $P_i^{ref}[k] \in [0, P_i^{max}]$ are computed for all EVs, ideally fair such that $\Sigma_{i \in C[k] \cup C[k]} P_i^{ref}[k] = P^{req}[k]$,
thereby minimizing an impact on battery life of EVs.

2. The method of claim 1, further comprising
formulating a mixed-integer-quadratic program based on integral terms to cope with time-dependent variables $(\rho_i, \lambda_i)$ such as
battery wearing, and
remaining energy demand.

3. The method of claim 2, wherein an on/off decision for EV i at time k is denoted by $\omega_i[k]$, and $\omega_i[k]=1$ (respectively, 0) means a decision to switch on (respectively, off) EV i at time k, and upon arrival, an EV is initially switched off, $\omega_i[k]$ being integer variables, the method further comprising introducing a ranking metric $r_i[k]$, which combines the operational margins with $\mu_i[k]$:

$$r_i[k] = \begin{cases} \dfrac{\hat{P}_i[k]}{P_i^{max} \mu_i[k]} & \text{if } \Delta P^{req}[k] < 0, \\ \dfrac{P_i^{max} - \hat{P}_i[k]}{P_i^{max} \mu_i[k]} & \text{otherwise} \end{cases},$$

wherein $\Delta P^{req}[k] = \tilde{P}^{req}[k] - \Sigma_{i \in C[k]} \hat{P}_i[k]$,
implementing a heuristic configured to reduce the number of integer variables to m, thereby reducing a complexity of the optimisation problem and enabling the solving of the optimisation problem in real-time,
whereby, if an amount of unlocked EVs is initially less than m≥1, then all these unlocked EVs are enabled to change their on/off decision, and, otherwise, determined m EVs with a largest metric $r_i$ are taken,
whereby a heuristic partitions the collection of unlocked EVs, $C[k]$, into three collections: EVs that are forced to be switched or remain on ($S^{on}[k]$), EVs that are forced to be switched or remain off ($S^{off}[k]$), and EVs for which the on/off decision is decided by the optimization problem ($S[k]$).

4. The method of claim 1, wherein, if $\tilde{P}^{req}[k] \notin [P^{lb}, P^{ub}]$ the method comprises looping until fulfilling a constraint of $\tilde{P}^{req}[k] \in [P^{lb}, P^{ub}]$,
wherein $$P^{lb} = \sum_{i \in S^{on}[k]} P_i^{min}, \quad P^{ub} = \sum_{i \in S^{on}[k] \cup S[k]} P_i^{max}.$$

5. The method of claim 4, whereby if $\tilde{P}^{req}[k]$ lies above the bounds $[P^{lb}, P^{ub}]$ the method comprises a step of forcing the EV from $S[k]$ with highest rank to be switched on, and replacing it with highest ranked EV in $\mathcal{R} = C[k] \setminus S[k]$, thereby automatically increasing $P^{ub}$, to eventually reach $\tilde{P}^{req}[k]$.

6. The method of claim 4, whereby if $\tilde{P}^{req}[k]$ lies below the bounds $[P^{lb}, P^{ub}]$ the method comprises a step of switching off the highest ranked EV from $S[k]$, and replacing it with the highest ranked EV in $\mathcal{R}$.

\* \* \* \* \*